(12) United States Patent
Hunt

(10) Patent No.: US 7,067,793 B2
(45) Date of Patent: *Jun. 27, 2006

(54) HIGH SPEED SELF-PIXELATING LOW LIGHT LEVEL OPTICAL SYSTEM

(75) Inventor: Jeffrey H. Hunt, Thousand Oaks, CA (US)

(73) Assignee: The Boeing Company, Chicago, IL (US)

(*) Notice: Subject to any disclaimer, the term of this patent is extended or adjusted under 35 U.S.C. 154(b) by 57 days.

This patent is subject to a terminal disclaimer.

(21) Appl. No.: 10/863,866

(22) Filed: Jun. 7, 2004

(65) Prior Publication Data

US 2005/0269485 A1 Dec. 8, 2005

(51) Int. Cl.
*G01L 31/00* (2006.01)
*G02F 2/02* (2006.01)

(52) U.S. Cl. .................. 250/214.1; 359/248; 359/326
(58) Field of Classification Search ............ 250/214.1; 359/245–248, 326
See application file for complete search history.

(56) References Cited

U.S. PATENT DOCUMENTS

| 5,521,743 | A | 5/1996 | Holmes et al. .......... 359/248 |
| 6,549,323 | B1* | 4/2003 | Hunt ...................... 359/279 |
| 6,720,588 | B1* | 4/2004 | Vickers .................. 257/186 |
| 6,819,476 | B1* | 11/2004 | Hunt ...................... 359/326 |
| 6,829,072 | B1* | 12/2004 | Hunt ...................... 359/248 |

OTHER PUBLICATIONS

Hunt, J.H.; Holmes, R.B.; McCormick, F.B. Imaging Via Spatial Light Modulation at Photon-Counting Light Levels, Lasers and Electro-Optics, 1996. CLEO '96, p. 519.*

J.H. Hunt and R.B. Holmes, Observation of Optical Response of Avalanche Photodiodes at Photon-Counting Light Levels, Journal, May 30, 1994, 3 pgs., Appl. Phys. Lett. 64 (22).*

(Continued)

*Primary Examiner*—Thanh X. Luu
*Assistant Examiner*—Stephen Yam
(74) *Attorney, Agent, or Firm*—MacPherson Kwok Chen & Heid LLP; Clifford G. Cousins (57) ABSTRACT

An optical system includes an InGaAsP photodiode having a bandgap and configured to operate in Gieger mode, a first light source configured to emit an optical signal of a first wavelength less than the bandgap at a first intensity, a second light source configured to emit light of a second wavelength greater than the bandgap at a second intensity, a beam combiner configured to combine the first and second wavelengths to simultaneously irradiate the photodiode with the first and second wavelengths, an electric field applied across the photodiode greater than a breakdown voltage thereof and configured to result in avalanching of electrons in the photodiode when the optical signal from the first light source is incident thereon and resulting in a photorefractive response within the photodiode, and an image capture device in optical communication with and configured to capture modulated light of the second wavelength reflected from the photodiode.

20 Claims, 4 Drawing Sheets

OTHER PUBLICATIONS

L. Qian, S.D. Benjamin, P.W.E. Smith, B.J. Robinson, and D.A. Thompson, Picosecond carrier lifetime and large optical nonlinearities in InGaAsP grown by He-plasma-assisted molecular beam epitaxy, Jan. 15, 1997, 3 pgs., vol. 22, No. 2, Optics Letter.

Li Qian, S.D. Benjamin, P.W.E. Smith, B.J. Robinson, and D.A. Thompson, Subpicosecond carrier lifetime in beryllium-doped InGaAsP grown by He-plasma-assisted molecular beam epitaxy, Sep. 15, 1997, 3 pgs., vol. 71, No. 11, Applied Physics Letter.

* cited by examiner

HIGH SPEED SELF-PIXELATING LOW LIGHT LEVEL OPTICAL SYSTEM

BACKGROUND

Figure 1:
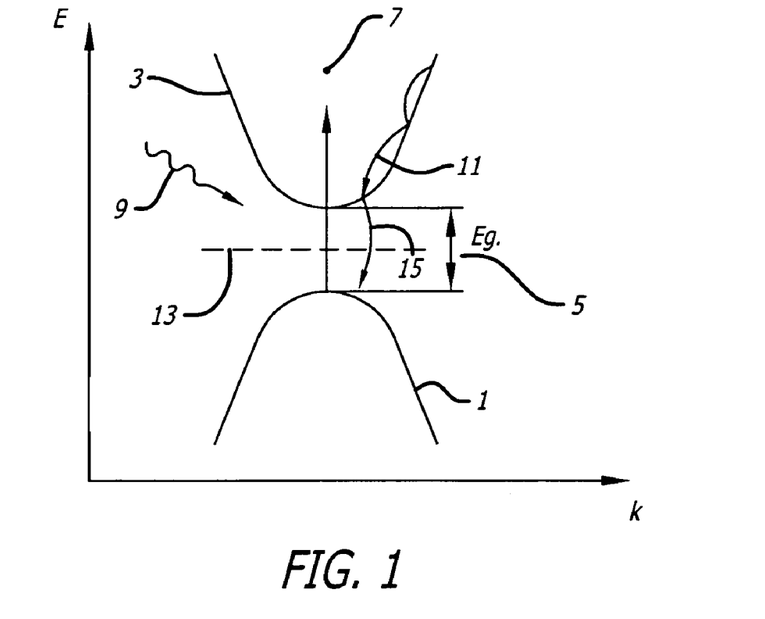
FIG. 1 shows a representation of activated electrons within an APD moving from the valence band to the conduction band when subjected to incident electromagnetic radiation.

Avalanche photodiodes (APD) are commonly used as photodetectors to detect the presence of photons within an area. Generally, the crystalline materials forming an APD include a conduction band and a valence band. The conduction band and the valence band are separated by an energy level (Eg) commonly referred to as a bandgap. As shown in FIG. 1, when electromagnetic radiation equal to or greater than the energy level Eg is incident on the surface of the crystalline APD material some electrons in the valence band 1 absorb the incident energy and are activated across the bandgap 5 to the conduction band 3. An exemplary source of incident electromagnetic radiation may include photons. This intrinsic activation results in the generation of one electron in the conductor band 5 and one hole in the valence band 3 for each interaction with the incident energy.

FIG. 1 shows an electron 7 which, when exposed to incident energy 9, has been activated across the bandgap 5 thereby moving from the valence band 1 to the conduction band 3. Thereafter, the absorption mechanism reaches a dynamic equilibrium in conjunction with recombination. As shown in FIG. 1, eventually the electron 7 activated to the conduction band 3 reaches a state of equilibrium 11 within the conduction band 3. Eventually, the activated electron 7 will leave the conduction band 3 via a recombination mechanism and return to valence band 1, thereby returning the crystalline material to a static state of thermodynamic equilibrium. FIG. 1 shows the electron 7 reaching thermodynamic equilibrium and moving along a path 15 from the conduction band 3 to the valence band 1. As such, activated electron returns to a state of equilibrium within a time period of T1.

Figure 2:
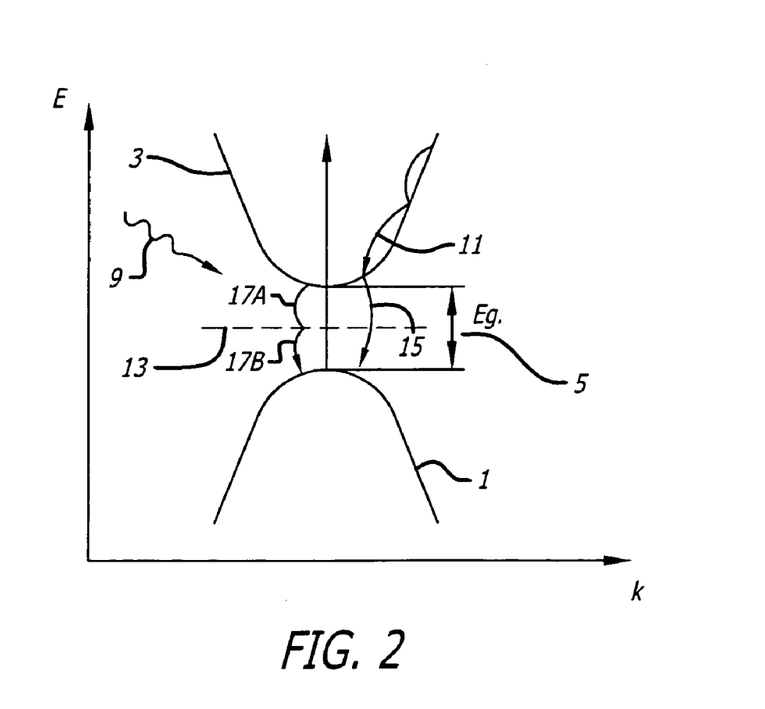
FIG. 2 shows a representation of activated electrons within an APD reaching thermodynamic equilibrium and returning to the valence band to the conduction band.
Figure 3:
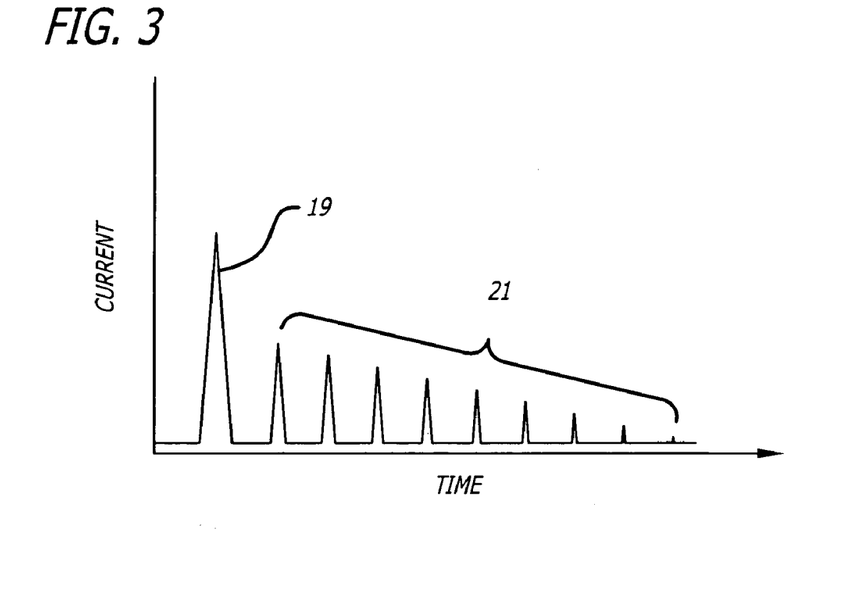
FIG. 3 shows the output of an APD following the incidence of electromagnetic radiation thereon and the generation of detector noise therein.

Often, the crystalline materials forming the APD include one or more irregularities or impurities therein which may affect the activation and relaxation process. FIGS. 1 and 2 show crystalline materials forming the APD having one or more irregularities or traps 13 therein. The trap 13 may prevent the electron 7 from immediately returning to a state of equilibrium until released by external stimuli (e.g. thermal agitation) or until a sufficient period of time passes. As shown in FIG. 2, some activated electrons return to the valence band 1 immediately, as illustrated by the direct path 15. However, some activated electrons encounter and are restrained from immediately returning to the valence band 1 by the trap 13. As such, the delayed electrons proceed on along a multiple paths 17A, 17B. Further, electrons encountering and restrained by the trap 13 will return to a state of equilibrium at a second time period of T2, wherein T2 is greater than T1. As such, photocurrents may continue to be generated within the APD after the application of photons to the APD has stopped. Typically, this phenomenon is referred to as dark current or detector noise. FIG. 3 shows an example of noise generated by traps within an APD. As shown, incident a photon on the APD generates a first photocurrent 19 within an electrical circuit coupled to the APD. The electrons delayed by the deep trap within the APD continue to generate secondary photocurrents 21 within the APD for a period following the cessation of the application of light to the APD.

When the APD is used to detect low levels of light the electrons delayed by the trap 13 may generate detector noise and/or dark current approximately equal to the amount of light incident on the APD. As such, the measuring accuracy of the APD may be inaccurate. Further, the responsiveness of the APD may be compromised, thereby requiring an extended period of time between measurement cycles to permit the detector to reach a state of equilibrium.

Thus, in light of the foregoing, there is an ongoing need for a system capable of rapidly detecting light at various levels.

BRIEF SUMMARY

Various embodiments of the high speed self-pixelating low light level optical system disclosed herein enable a user to reconstruct an image received at a first wavelength at a low intensity at a second wavelength of high intensity. Furthermore, the various systems disclosed herein permit optical-to-optical conversion of optical signals, thereby reproducing the low intensity input signal at a user-determined wavelength at a higher intensity while reducing or eliminating the amount of noise introduced into the optical signal.

In one embodiment the present application is directed to a high speed self-pixelating optical system and includes an InGaAsP photodiode having a bandgap and configured to operate in Geiger mode, a first light source configured to emit an optical signal of a first wavelength at a first intensity, the first wavelength less than the bandgap of the photodiode, a second light source configured to emit light of a second wavelength at a second intensity, the second wavelength greater than the bandgap of the photodiode, a beam combiner positioned within an optical path and configured to combine the first and second wavelengths to simultaneously irradiate the photodiode with the first and second wavelengths of light, an electric field applied across the photodiode greater than a breakdown voltage thereof, the electric field configured to result in avalanching of electrons in the photodiode when the optical signal from the first light source is incident thereon, the avalanche of electrons resulting in a photorefractive response within the photodiode, and an image capture device in optical communication with and configured to capture modulated light of the second wavelength reflected from the photodiode, In another embodiment, the present application is directed to a high speed self -pixelating optical system and includes an InGaAsP photodiode having a bandgap and configured to operate in Geiger mode, a first light source configured to emit an optical signal of a first wavelength at a first intensity, the first wavelength less than the bandgap of the photodiode, a second light source configured to emit light of a second wavelength at a second intensity, the second wavelength greater than the bandgap of the photodiode, a beam combiner positioned within an optical path and configured to combine the first and second wavelengths to simultaneously irradiate the photodiode with the first and second wavelengths of light, an electric field applied across the photodiode greater than a breakdown voltage thereof, the electric field configured to result in avalanching of electrons in the photodiode when the optical signal from the first light source is incident thereon, the avalanche of electrons resulting in a photorefractive response within the photodiode, an image capture device in optical communication with and configured to capture modulated light of the second wavelength reflected from the photodiode, and a memory device coupled to the image capture device and configured to receive and store image information received therefrom.

The present application further discloses various optical-to-optical conversion methods for converting an optical signal of a first wavelength at a first intensity to a second wavelength at a second intensity. One method disclosed in the present application includes biasing a photodiode to operate in Geiger mode, irradiating the photodiode with a first wavelength of light to which the photodiode is sensitive, the first wavelength of light transmitting an optical signal at a first intensity, irradiating the photodiode with a second wavelength of light to which the photodiode is insensitive, the second wavelength of light at a second intensity, the second intensity greater than the first intensity, modulating light reflected from a surface of the photodiode with a photorefractive reaction within the photodiode, capturing the modulated reflected light, and simultaneously irradiating the photodiode with the first and second wavelengths of light.

In an alternative embodiment, the present application discloses configuring a photodiode to operate in Geiger mode, irradiating the photodiode with a first wavelength of light transmitting an optical signal at a first intensity, initiating a photorefractive reaction within the photodiode with a first wavelength of light, irradiating the photodiode with a second wavelength of light to which the photodiode is insensitive, the second wavelength of light at a second intensity, the photodiode being simultaneously irradiated with the first and second wavelengths of light, modulating light reflected from a surface of the photodiode with the photorefractive reaction within the photodiode, capturing the modulated reflected light, and processing the captured modulated light to form an image.

Other features and advantages of the embodiments of the high speed self-pixelating optical system disclosed herein will become apparent from a consideration of the following detailed description.

BRIEF DESCRIPTION OF THE DRAWINGS

A high speed self-pixelating low light level detector will be explained in more detail by way of the accompanying drawings, wherein.

DETAILED DESCRIPTION

Figure 4:
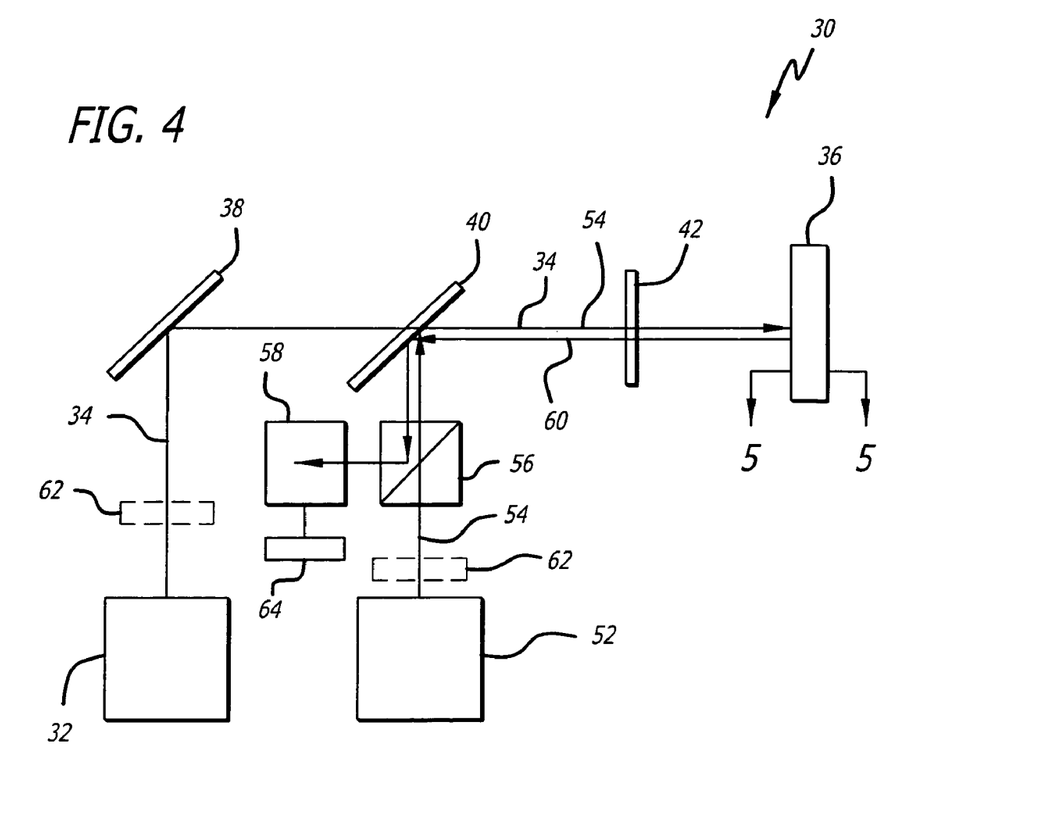
FIG. 4 shows a schematic diagram of an embodiment of an optical system incorporating a high speed self-pixelating low light detector therein.

FIG. 4 shows a schematic diagram of an embodiment of an optical system incorporating a high speed self-pixelating low light level detector therein. As shown in FIG. 4, the optical system 30 includes a first light source 32 configured to emit a first wavelength of light 34 to the self-pixelating low light level detector 36 (hereinafter low light detector). In one embodiment, the low light detector 36 comprises an InGaAsP photodiode configured to operate in Geiger mode. Optionally, the low light detector 36 may be manufactured from any variety of material, including, without limitation, Indium Gallium Arsenide (InGaAs), Silicon (Si), Germanium (Ge), Gallium Nitride (GaN), Silicon Carbide (SiC), or any other suitable materials, In addition, the low light detector 36 may be manufactured in any number of sizes or shapes as desired. For example, in one embodiment, the low light detector 36 may be configured to form an asymmetric Fabry-Perot etalon. Optionally, the low light detector 36 may comprise a photodiode array having multiple photodiodes positioned proximate to each other.

Referring again to FIG. 4, the first light source 32 is configured to emit a first wavelength of light 34 having a wavelength shorter than the bandgap of the low light detector 36. For example, in one embodiment the first wavelength of light 34 is less than 1.59 microns. As a result, the first wavelength of light 34 will be absorbed by the low light detector 36, and may thus be considered an input thereto. In one embodiment, the intensity of the first wavelength 34 of light may be low intensity light. For example, the intensity may be from about 1 picowatt, corresponding to approximately 106 photons per second at the aforementioned photo energies or more and may project an image or signal to the low light detector 36. The first wavelength of light 34 is incident upon a beam director 38 which directs the light through a beam combiner 40 to the low light detector 36. As shown in FIG. 4, at least one optical filter 42 may be positioned within the optical path between the first light source 32 and the low light detector 36. In the illustrated embodiment, a λ/4 plate 42 is positioned within the optical path between the beam combiner 40 and the low light detector 36. Optionally, any number or variety of optical filters 42 may be used with the optical system 30.

Referring again to FIG. 4, the optical system 30 further includes a second light source 52 configured to emit a second wavelength of light 54 to the low light detector 36. In one embodiment, a second wavelength of light 54 has a wavelength longer than the bandgap of the low light detector 36. As a result, the second wavelength of light 54 will not be absorbed by the low light detector 36. The second wavelength of light 54 is incident upon and traverses through a beam splitter 56. In one embodiment, the beam splitter 56 comprises a polarizing beam splitter. The second wavelength of light 54 is directed to the low light detector 36 with the beam combiner 40. As such, the second wavelength of light 52 is combined with the first wavelength of light 34 by the beam combiner 40. The second wavelength of light 54, which is combined with the first wavelength of light 34, is directed through the optical filter 42 and is incident upon the low light detector 36.

Positioned within the optical system 30 is an image capture device 58 in optical communication with the beam splitter 56. Exemplary image capture devices 58 include, without limitation, cameras, CCD devices, imaging arrays, photometers, and like devices. In one embodiment, the image capture device 58 is coupled to a storage or memory device 64. For example, the memory device 64 may comprise a computer coupled to the image capture device 58 thereby permitting the user to store and recall information received therefrom. The image capture device 58 is configured to receive light reflected from a surface of the low light detector 36. In the illustrated embodiment, the reflected light 60 is directed to the beam splitter 56 by the beam combiner 40. In an alternate embodiment, the image capture device 58 may be configured to capture reflected light directly from the low light detector 36, thereby foregoing the beam combiner 40 and the beam splitter 56.

Optionally, additional optical components 62 may be positioned anywhere within the optical system 30. For example, additional optical components 62 may be positioned proximate to the first light source 32. In an alternate embodiment, additional optical components 62 are positioned proximate to the second light source 52. Exemplary additional optical components 62 include, without limitation, wavelength filters, spatial filters, shutters, light modulators, light valves lens, objectives, or the like.

Figure 5:
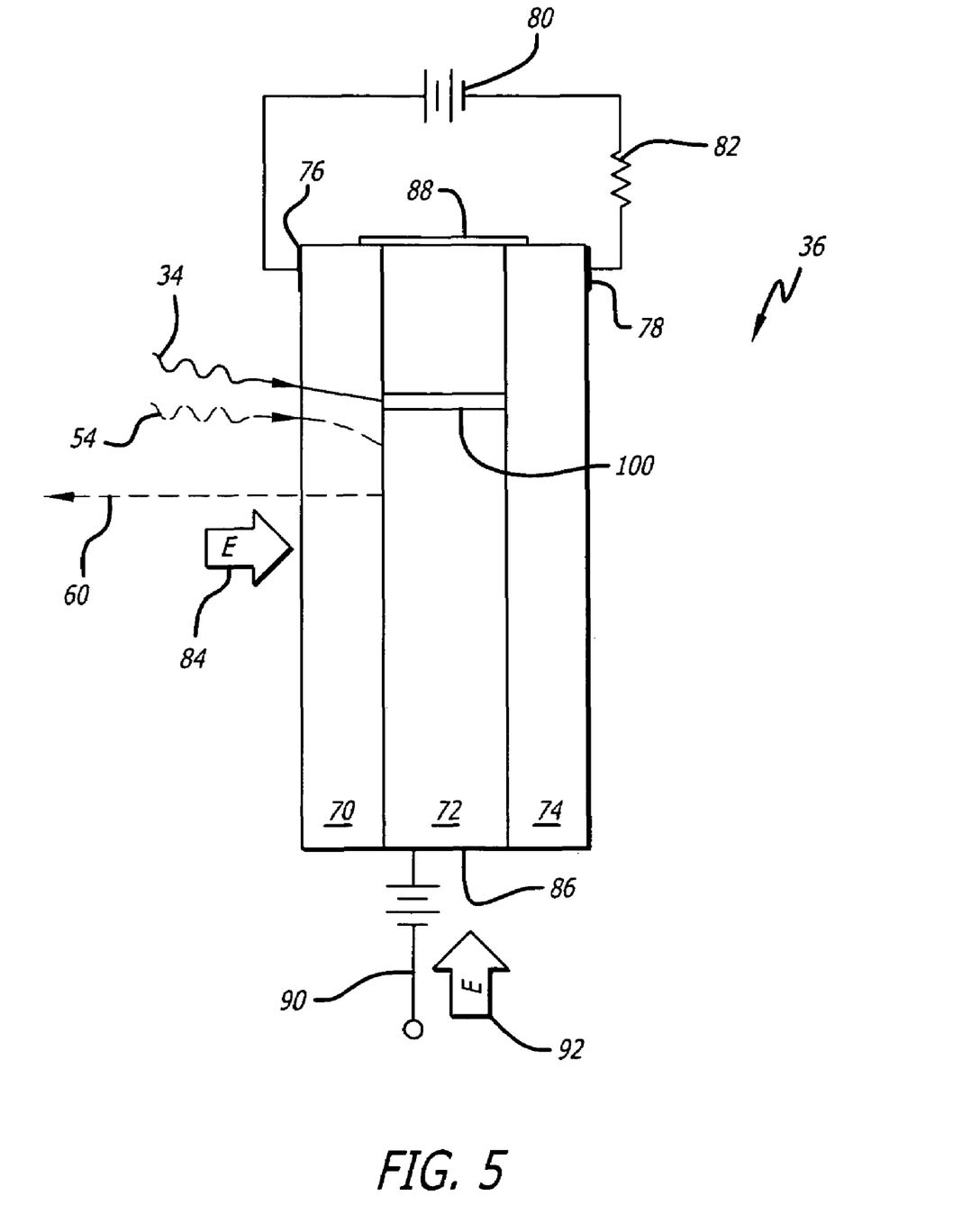
FIG. 5 shows a cross sectional view of an embodiment of a high speed self-pixelating low light detector as viewed along lines 5—5 of FIG. 4.

FIG. 5 shows an embodiment of a low light detector for use within an optical system. As shown, the low light detector 36 includes a first layer 70, a second layer 72, and a third layer 74. In one embodiment, the first layer 70 comprises a positively doped semi-conductive material configured to permit an avalanche of electrons to be freed when struck with a photon. For example, in one embodiment the positively doped semi-conductive material comprises silicon. In an alternate embodiment, the first layer 70 is comprised of indium phosphide and is heavily doped with a P-type material such as zinc. As a result, the first layer 70 loses its semi-conductive properties and functions similar to a conductor. The second layer 72 is either a negative layer or an insulator. For example, the second layer 72 maybe manufactured without doping or with low doping. The third layer 74 is a negative layer. In one embodiment, the third layer 74 is moderately doped with an N-type material. In another embodiment, the third layer 74 is heavily doped with an N-type material such as sulfur, for example, such that the third layer no longer behaves as a semiconductor but instead has a reasonable good conductivity. Optionally, the first, second, and/or third layers 70, 72, 74, respectively, may include at least one surface which may be partially reflective to light of a selective wavelength.

Referring again to FIG. 5, a first set of electrodes 76, 78 is connected to a voltage source 80. The first voltage source 80 is configured to apply a charge across the low light detector 36. Optionally, a circuit resistor 82 may be positioned between the voltage source 80 and at least one of the electrodes 76, 78. As a result, a first electric field 84 may be created across the low light detector 36. As such, the low light detector 36 may be configured to be operated in Geiger mode. Optionally, the low light detector 36 may also include a second set of electrodes 86, 88 coupled to a second voltage source 90. As such, a second electric field 92 may be created within or surrounding the low light detector 36. In the illustrated embodiment, the second electric field 92 is perpendicular to the first electric field 84. Optionally, any number of electric fields or field directions may be used. Furthermore, the low light detector 36 may be manufactured in any number of sizes or shapes as desired. For example, in one embodiment, the low light detector 36 may be configured to form an asymmetric Fabry-Perot etalon.

When operated in Geiger mode, the incidence of a photon having an energy below the bandgap of the low light detector 36 causes a chain reaction of freeing electrons in a photodiode material. The freeing of electrons within the low light detector 36 continues until the current within the electrical field applied to the low light detector 36 drops to zero or until the voltage falls below the breakdown voltage. Further, the freeing electrons cause localized pixel heating due to absorption within the materials forming the low light detector. As a result, the refractive index of the materials forming the low light detector is modulated in response to the localized pixel heating.

FIG. 5 shows photons of the first wavelength 34 from the first light source 32 (see FIG. 4) incident on the low light detector 36. As the energy of the first wavelength of light 34 is below the bandgap of the low light detector 36 a change in temperature is formed within a region or micro-channel 100 of the materials forming the low light detector 36. This change in temperature within the materials results in a corresponding change in the index of refraction. The index of refraction is modulated to recreate the signal projected by the first light source 32. As such, when the low light detector 36 is simultaneously irradiated with the second wavelength 54, which has an energy grater than the bandgap of the low light detector 36, the second wavelength of light 54 will be reflected by a surface of the low light detector 36. The reflected light 60 is modulated by the change in the refractive index of the low light detector 36. As such, the reflected light 60 will be imprinted with the signal from the first light source 32. Therefore, the optical signal carried and/or projected by the first light source 32 at low intensity may be detected by low light detector 36 and imprinted on the second wavelength of light 54 of higher intensity.

Figure 6:
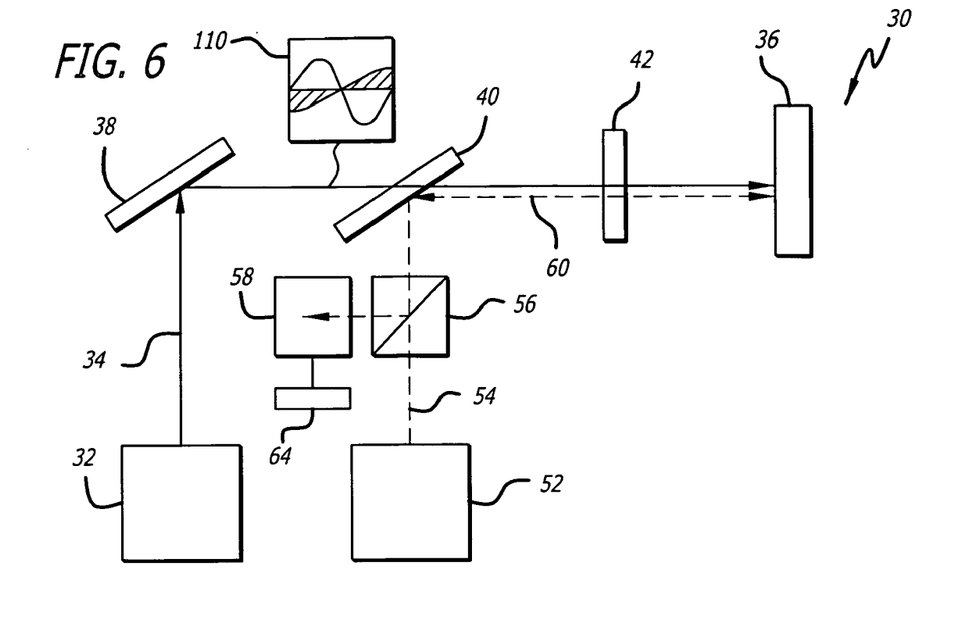
FIG. 6 shows a schematic diagram of the embodiment of the optical system shown in FIG. 4 wherein light at a first wavelength is incident of the high speed self-pixelating low light detector.
Figure 7:
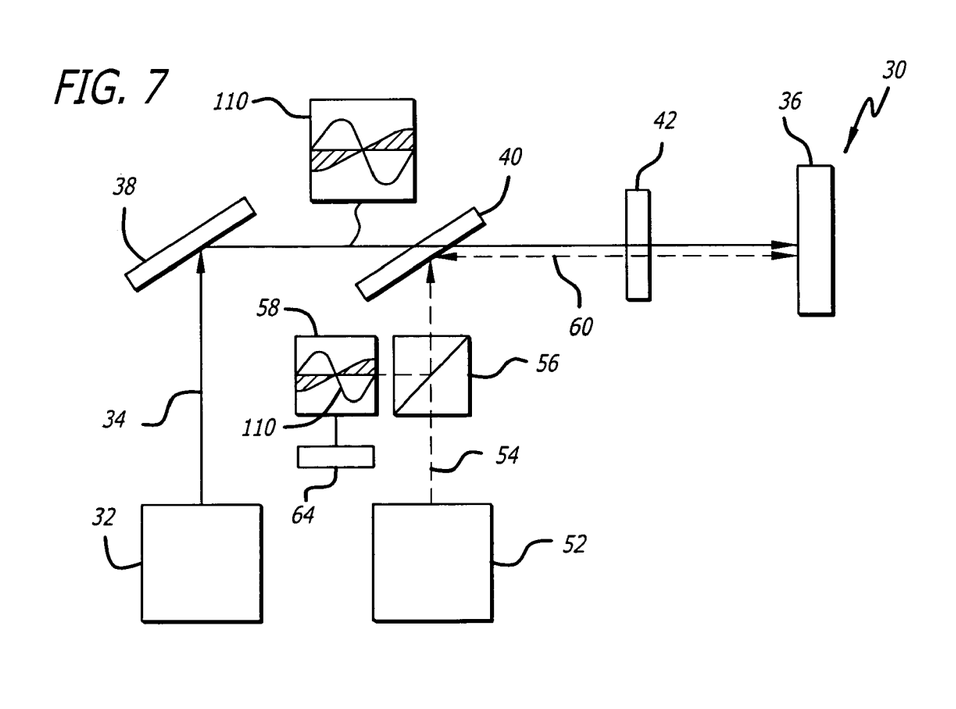
FIG. 7 shows a schematic diagram of the embodiment of the optical system shown in FIG. 4 wherein light at a second wavelength is reflected by the high speed self-pixelating low light detector to an image capture device.

FIGS. 6 and 7 show an embodiment of the optical system 30 during use. As shown in FIG. 6, the first wavelength of light 34 emitted by the first light source 32 contains an image or signal 110 which is directed to the low light detector 26 by the beam director 38. In the illustrated embodiment, the first wavelength of light 34 is a low intensity signal. In addition, the low light detector 36 is simultaneously irradiated with the second wavelength of light 54 of high intensity emitted by the second light source 52. The first wavelength of light 34 containing the signal 110 and a second wavelength of light 54 are combined by the beam combiner 40 and are directed through the optical filter 42 to the low light detector 36. As described above, the low light detector 36 is configured to operate in Geiger mode. The first wavelength of light 34 causes localized pixel heating due to absorption within the photodiode materials, thereby inducing modulation of the refractive index of the photodiode material. As shown in FIG. 6, the reflectivity of the low light detector 36 is modulated at a point where the photons of the first wavelength of light 34 are incident upon the low light detector 36. The index of refraction and reflectivity of the photodiode materials is modulated in the same pattern as the image or signal 110 from the first wavelength of light 34. As such, the reflected light 60 reflected from the low light detector 36, at the second wavelength which is greater than the bandgap of the low light detector 36, is modulated to reproduce the image or signal 110.

As shown in FIG. 7, the capture device 58 captures the image signal 110 at the second wavelength 54. If included in the system, the memory device 64 coupled to the image capture device 58 stores information received therefrom. For example, in one embodiment, the image capture device 58 may be configured to record single photons detected by the low light detector 36. Unlike prior art systems, the high speed optical system 30 disclosed herein returns to a thermodynamic equilibrium on the order of about 1 nanosecond. Furthermore, electrons delayed by deep traps formed within the crystalline materials forming the low light detector 36 return to thermodynamic equilibrium much faster than prior art systems. For example, the electrons delayed by deep traps may return to the valence band 1 (see FIG. 1) in about 1 nanosecond. As the optical system 30 is more responsive than prior art systems, the high speed optical system disclosed herein enables the user to detect an optical signal of a first wavelength at a low intensity and rapidly convert the signal to a second wavelength at a higher intensity. In addition, the memory device 64 may be configured to receive and store image information received the image capture device 58 from the low light detector 36 over a period of time and, thereafter, reconstruct an image incident on the low light detector 36, thereby permitting the optical system to operate as a low light imaging device Embodiments disclosed herein are illustrative of the principles of the invention. Other modifications may be employed which are within the scope of the invention, thus, by way of example but not of limitation, alternative low light detector configurations, alternative beam director devices, alternative optical filters, and alternative electronic components. Accordingly, the devices disclosed in the present application are not limited to that precisely as shown and described herein.

What is claimed is:

1. A device, comprising:
   an InGaAsP photodiode having a bandgap, the photodiode configured to operate in Geiger mode;
   a first light source configured to emit an optical signal of a first wavelength at a first intensity, the first wavelength less than the bandgap of the photodiode;
   a second light source configured to emit light of a second wavelength at a second intensity, the second wavelength greater than the bandgap of the photodiode;
   a beam combiner positioned within an optical path and configured to combine the first and second wavelengths to simultaneously irradiate the photodiode with the first and second wavelengths of light;
   an electric field applied across the photodiode greater than a breakdown voltage thereof, the electric field configured to result in avalanching of electrons in the photodiode when the optical signal from the first light source is incident thereon, the avalanche of electrons resulting in a photorefractive response within the photodiode; and
   an image capture device in optical communication with and configured to capture modulated light of the second wavelength reflected from the photodiode.

2. The device of claim 1 wherein the second intensity is greater than the first intensity.

3. The device of claim 1 wherein the beam combiner is positioned between the first and second light sources and the photodiode.

4. The device of claim 1 further comprising at least one optical filter positioned between the first and second light sources and the photodiode.

5. The device of claim 4 wherein the optical filter comprises a λ/4 plate.

6. The device of claim 1 wherein the capture device comprises at least one device selected from the group consisting of cameras, CCD devices, imaging arrays, and photometers.

7. A device, comprising:
   an InGaAsP photodiode having a bandgap, the photodiode configured to operate in Geiger mode;
   a first light source configured to emit an optical signal of a first wavelength at a first intensity, the first wavelength less than the bandgap of the photodiode;
   a second light source configured to emit light of a second wavelength at a second intensity, the second wavelength greater than the bandgap of the photodiode;
   a beam combiner positioned within an optical path and configured to combine the first and second wavelengths to simultaneously irradiate the photodiode with the first and second wavelengths of light;
   an electric field applied across the photodiode greater than a breakdown voltage thereof, the electric field configured to result in avalanching of electrons in the photodiode when the optical signal from the first light source is incident thereon, the avalanche of electrons resulting in a photorefractive response within the photodiode;
   an image capture device in optical communication with and configured to capture modulated light of the second wavelength reflected from the photodiode; and
   a memory device coupled to the image capture device and configured to receive and store image information received therefrom.

8. The device of claim 7 wherein the second intensity is greater than the first intensity.

9. The device of claim 7 wherein the beam combiner is positioned between the first and second light sources and the photodiode.

10. The device of claim 7 further comprising at least one optical filter positioned between the first and second light sources and the photodiode.

11. The device of claim 10 wherein the optical filter comprises a λ/4 plate.

12. The device of claim 7 wherein the capture device comprises at least one device selected from the group consisting of cameras, CCD devices, imaging arrays, and photometers.

13. The device of claim 7 wherein the memory device comprises a computer.

14. The system of claim 1, wherein the InGaAsP photodiode comprises a low light level detector.

15. A method comprising:
    biasing a photodiode to operate in Geiger mode;
    irradiating the photodiode with a first wavelength of light to which the photodiode is sensitive, the first wavelength of light transmitting an optical signal at a first intensity;
    irradiating the photodiode with a second wavelength of light to which the photodiode is insensitive, the second wavelength of light at a second intensity, the second intensity greater than the first intensity;
    modulating light reflected from a surface of the photodiode with a photorefractive reaction within the photodiode;
    capturing the modulated reflected light; and
    simultaneously irradiating the photodiode with the first and second wavelengths of light.

16. The method of claim 15 further comprising processing the captured modulated light to form an image.

17. The method of claim 15,
    wherein the photodiode has a bandgap, and
    wherein the first wavelength is less than the bandgap of the photodiode and the second wavelength is greater than the bandgap of the photodiode.

18. The method of claim 17, wherein the photodiode is an InGaAsP photodiode.

19. The method of claim 15 wherein the photodiode comprises a low light level detector.

20. A method comprising
    configuring a photodiode to operate in Geiger mode;
    irradiating the photodiode with a first wavelength of light transmitting an optical signal at a first intensity;

initiating a photorefractive reaction within the photodiode with a first wavelength of light;
irradiating the photodiode with a second wavelength of light to which the photodiode is insensitive, the second wavelength of light at a second intensity, the photodiode being simultaneously irradiated with the first and second wavelengths of light;

modulating light reflected from a surface of the photodiode with the photorefractive reaction within the photodiode;
capturing the modulated reflected light; and
processing the captured modulated light to form an image.

* * * * *